United States Patent [19]
Platus et al.

[11] Patent Number: 5,697,998
[45] Date of Patent: Dec. 16, 1997

[54] SAPPHIRE WINDOW LASER EDGE ANNEALING

[75] Inventors: Daniel H. Platus, Rancho Palos Verdes; Richard P. Welle, Hawthorne; Paul M. Adams, Redondo Beach, all of Calif.

[73] Assignee: The Aerospace Corporation, El Segundo, Calif.

[21] Appl. No.: 611,113

[22] Filed: Mar. 5, 1996

[51] Int. Cl.$^6$ ............ C03B 21/00; C03B 23/00; C03B 25/00; C03B 31/00

[52] U.S. Cl. ............ 65/104; 65/111; 65/DIG. 4

[58] Field of Search ............ 65/111, 104, 348, 65/41, DIG. 4; 219/121.72

[56] References Cited

U.S. PATENT DOCUMENTS

| | | | |
|---|---|---|---|
| 4,338,114 | 7/1982 | Brockway et al. | 65/28 |
| 4,375,993 | 3/1983 | Mori et al. | 148/1.5 |
| 5,533,040 | 7/1996 | Zhang | 372/25 |

OTHER PUBLICATIONS

"Infrared Window and Dome Materials",D.C. Harris, SPIE Optical Engineering Press, vol. TT 10, pp. 38–41, Jul. 1972.
"CRC Handbook of Chemistry and Physics",R.C. Weast, CRC Press, Inc., 67th ed., pp. B–68, B–103, B–126, B–127, B–143, B–145, 1986–1987.
"High Performance Sapphire Windows",S.C. Bates, NTIS, Technology 2002, vol. 2, pp. 460–469, Dec. 1962.
"Fracture in Ceramic Materials, The Thermal Fracture of Alumina", edited by A.G. Evans, et al.. pp. 336–364, 1984.
"Preparation of High–Strength Sapphire Crystals" Proceedings of the British Ceramic Society, No. 6, pp. 9–16, Jun. 1966.
"High Intensity Luminescence From pulsed Laser Annealed Europium Implated Sapphire", by N. Can, et al. Appl. Phys. Lett. vol. 65, No. 15, Oct. 10, 1994.
"X–Ray Photoelectron Spectroscopy of UV Laser Irradiated Sapphire and Alumina", by A.J. Pedraza, et al. Res. vol. 9, No. 9, Sep. 1994.
"Laser Induced Damage in Transparent Dielectrics: Ion Beam Polishing as a Means of Increasing Surface Damage Thresholds", by C.R. Giuliano Appl. Phys. Lett. vol. 21, No. 1, Jul. 1, 1972.
"Measurements of the Melt Dynamics in Laser Annealed Semiconductors", by P.S. Peercy, et al. Physica vol. 116b,.
"Timed Resolved Measurements of Interface Dynamics During Pulsed laser Melting Observed by Transient Conductance", by M.O. Thompson, et al. Mat.Res.Soc.Symp.Proc., vol. 13, pp. 57–67, 1983.
"CW Laser Annealing of Ion Implanted Oxidized Silicon Layers on Sapphire", by G. Alestig, et al. Mat.Res.Soc.Symp.Proc., vol. 13, 1983.
"Laser Sealed Vacuum Insulating Window", by D.K. Benson, et al. U.S. Patent Application, S/N 767,218 published, AIAA Technical Library, Aug. 1985.

*Primary Examiner*—Donald E. Ozaja
*Assistant Examiner*—Jacqueline A. Ruller
*Attorney, Agent, or Firm*—Derrick Michael Reid

[57] ABSTRACT

A sapphire window is laser edge annealed using a $CO_2$ laser spot illuminating along a path following the edge of the window so as to heat the edges to remove or reduce sub surface defects which can cause stress fractures.

3 Claims, 1 Drawing Sheet

SAPPHIRE WINDOW LASER EDGE ANNEALING

STATEMENT OF GOVERNMENT INTEREST

The invention was made with Government support under Contract No. F04701-93-C-0094 by the Department of the Air Force. The Government has certain rights in the invention.

The invention described herein may be manufactured and used by and for the government of the United States for governmental purpose without payment of royalty therefor.

STATEMENT OF RELATED APPLICATION

The present patent application is related to applicant's copending application Ser. No. 08/608,805, filed: Feb. 27, 1996, entitled "Method for Thermally Testing with a Laser the Edge of a Sapphire Window".

FIELD OF THE INVENTION

The present invention relates to the field of laser annealing. More particularly, the present invention relates to laser edge annealing of sapphire windows which may be used in high speed missiles, missile interceptors, rockets, seekers, and or atmospheric re-entry vehicles.

BACKGROUND OF THE INVENTION

Various high velocity missiles, missile interceptors, rockets, seekers and atmospheric re-entry vehicles may require the use of a window through which optical signals, such as laser beams or infrared radiation, may be used to acquire land based facilities or airborne targets. Specifically, high performance interceptor missiles employ infrared seekers to track incoming targets and guide the interceptor to these targets. An essential component of the interceptor is the seeker window which must be transparent to the infrared radiation and be able to structurally withstand aerodynamic pressure loading and intense aerodynamic heating. The preferred seeker window material is single crystal sapphire because sapphire optical properties are well suited for infrared transmission and sapphire thermal mechanical properties make the sapphire resistant to thermal stress fracture relative to other available window materials.

These sapphire windows are subjected to excessive stress during flight. These flight stresses may cause cracking, breakage or failure of the window. The sapphire window is potentially a performance-limiting component of a high velocity interceptor missile. Typically, the edge of the window is secured to a window frame through edge clamping using molding. In some specific applications, the window may be made of sapphire and the window edge may be beveled and adapted in shape to be mounted within a vehicle window frame and securely clamped by the window molding.

Computer analyses and thermal stress fracture testing of sapphire windows indicate that failure under simulated flight loading occurs at the window edge because the highest thermal stresses that cause fracture occur at the window edge and because the window is weakest at the edges from machining damage during fabrication which produces microscopic flaws in a small layer at the window edge surface. Machining damages the top layer which has much lower strength than the undisturbed bulk single crystal sapphire. The optical surfaces of the window surface area are also subject to machining and polishing damage but the nature of the flight induced thermal stresses and polishing of these flat surfaces are such that thermal fracture is much less likely to occur at these surfaces than at the window edges. There exists a need to manufacture windows with increased resistance to stresses at the edges of the windows.

For application as a high velocity flight window, the sapphire window is polished for improved optical transmission through the window. Chemical etch polishing, abrasive polishing, and flame polishing may be used to polish ceramic materials. Abrasive polishing is preferred because of the precision and simplicity of the abrasive polishes without the use of dangerous chemicals used in chemical etch polishing nor the use of imprecise flame polishing or flame annealing. Flame polishing has been shown to increase the strength of small sapphire specimens by up to an order of magnitude, but flame polishing degrades the optical quality of abrasively polished optical surfaces.

Sapphire is known to be a relatively hard ceramic. Hard ceramic materials generally fail due to tension stresses. Sapphire high velocity flight windows may be subject to tension stresses at the edge. There exists a need to improve the stress resistance of edges of high velocity ceramic windows without the use of a high temperature annealing process applied to the entire window. High temperature annealing of the ceramics can improve the tensile strength, but disadvantageously may destroy the optical precision of the polished surface. Bulk high temperature annealing of single crystal sapphire near the melt temperature increases structural strength, but deforms optical surfaces. Low temperature annealing of unpolished windows may increase tensil strength but may not completely reduce imperfections leading to fracture failures under stress, and will not reduce stress introduced in the edge during post annealing edge machining. These and other disadvantages are solved or reduced using the present invention.

SUMMARY OF THE INVENTION

An object of this invention is to improve edge stress resistance of ceramic materials.

Another object of this invention is to improve the edge stress resistance of sapphire windows without degrading the optical surface of the windows.

Yet another object of the present invention is to edge anneal ceramic materials for improving edge stress resistance without introducing large temperature gradients and thermal stresses which may weaken or fracture the ceramic materials.

Still another object of the present invention is to edge anneal sapphire windows for improved thermal stress resistance without degrading the optical properties of the optical surface.

Still another object of the present invention is to provide a method of edge annealing sapphire windows for improved thermal stress resistance without degrading the optical properties of the optical surface.

The present invention covers edge annealing of optical ceramic materials. The edge annealing increases the tensile strength of the window at the edge. The edge annealing can be accomplished without serious degradation of the polish of any optical surfaces of the optical ceramic which is in the form of a polished window. Fractures along the edges is the most common failure mechanism of the sapphire window. The invention broadly covers edge annealing of optical ceramics. In the preferred form of the invention, a sapphire window is first polished to optical specification and then placed in an oven for a general low temperature anneal in combination with the laser edge annealing. This edge anneal processing improves the edge tensile strength without degrading the optical properties of the polished surface. These and other advantages will become more apparent from the following detailed description of the preferred embodiment.

DETAILED DESCRIPTION OF THE PREFERRED EMBODIMENT

Figure 1:
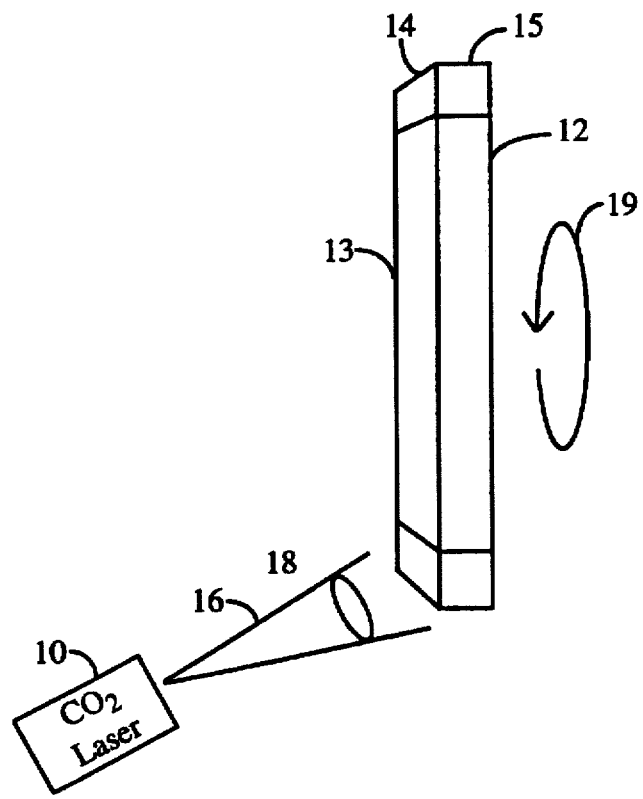
FIG. 1 is diagram showing laser edge annealing of an optical ceramic window.
Figure 2:
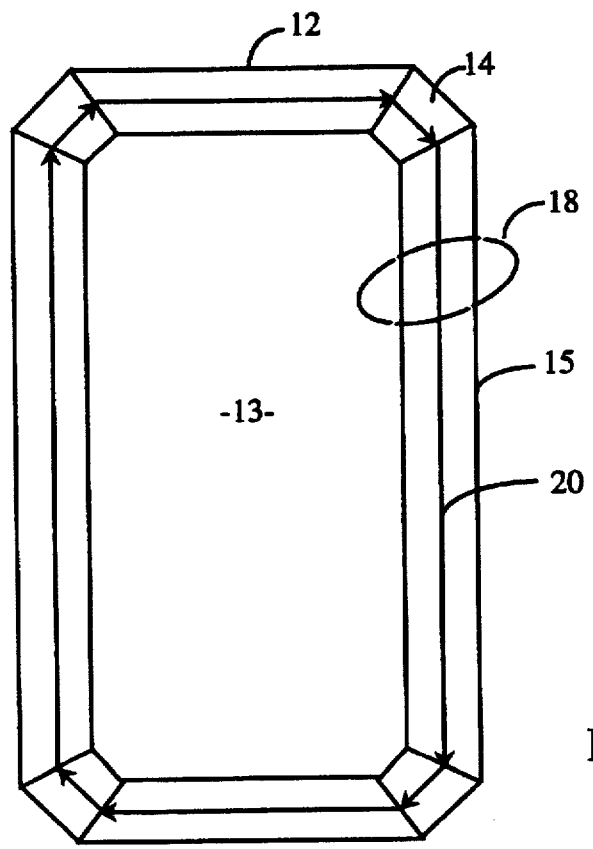
FIG. 2 is diagram showing the path of a laser spot along the edge of the optical ceramic window.

An embodiment of the present invention is described with reference to the figures using reference designations as shown in FIGS. 1 and 2. Referring to FIGS. 1 and 2, an optical means 10, which is preferably a carbon-dioxide ($CO_2$) laser, illuminates an optical ceramic 12. The optical ceramic 12 is preferably a high performance seeker sapphire window. The optical ceramic 12 has an optical surface 13 defined by an edge 15, which may comprise a vertical edge 13 and a beveled surface 14. The ceramic 12 may be edge strength limited, in that, during use under stress, failure, if any, is likely to occur at the edge 15. The beveled surface 14 is machined into a shape adapted for purposes of mounting the optical ceramic 12. The optical ceramic may be mounted into a window frame, not shown. Aerodynamic heating subjects the optical ceramic 12 to stresses during use.

The laser 10 illuminates the edge 15 to heat treat the sapphire window edge to anneal out any surface or subsurface damage and reduce the window susceptibility to thermal stress fracture. The edge annealing increases the thermal stress fracture resistance of the ceramic optical window. The $CO_2$ laser is suitable for performing the window edge treatment because the absorption of $CO_2$ wavelength laser radiation in sapphire is relatively high causing a very thin layer of the surface exposed to the laser to heat up. Other similar lasers and other corresponding optical ceramics can be used and treated in a similar fashion. Depending on the laser power and the exposure time, the thin surface layer may be heated to the sapphire melt temperature to remove or reduce machining defects in the sapphire.

The laser 10 projects a laser beam 16 having a defined spot size 18. Lasers 10 are well known to be controlled to predetermined power levels, direction, and duration. Those skilled in the art of optics can readily design control means to control the laser 10 to illuminate the edge 15 of the optical ceramic 12 along the path 20. The spot illumination 18 substantially illuminates the edge 15 and insubstantially illuminates the optical surface 13 thereby causing the edge 15 to heat up while the remaining bulk portion of the ceramic 12, and particularly the optical surface 13, does not substantially heat up to the melt or anneal temperature.

Laser annealing is more controllable than flame polishing and can be performed at temperatures close to the melt temperature to minimize the effect of thermal gradients, yet low enough to maintain shape stability of the fabricated window. After a slow cool down, the optical surfaces could be finished to meet optical specification without creating imperfection at the edges 15. No finishing of the edges 15 is necessary because the edges 15 typically have no optical requirements and are not use as the primary optical surface 13. The specification of the edges 15 are typically limited only by the mounting specification of the window frame. The laser 10 may illuminate the ceramic 12 through an oven window, not shown, while the ceramic 12 is in a low temperature annealing oven.

The optical means 10 in the form of a $CO_2$ laser requires power in the laser spot of typically 100 W/cm2 to 300 W/cm2 applied for one to several seconds to anneal an optical ceramic 12 in the form of a sapphire seeker window of approximate dimensions 10 cm wide×20 cm long×0.5 cm thick. The ceramic would normally be pre-heated in a conventional oven to a temperature slightly below its annealing temperature. The laser would then raise the temperature of a local spot above the annealing temperature. By scanning the beam, all areas of the ceramic requiring annealing are successively illuminated and thereby annealed. The bulk ceramic is then slowly cooled to room temperature. For a typical spot size of 1 cm×1 cm, this technique requires a total power in the laser beam of 100 W to 300 W. Assuming 50% losses in laser power from optics and other sources, this requires a total laser power in the range of 200 W to 600 W. The laser spot is located typically on the window edge by means of an aperture. For a laser as the optical means 10, the laser can be located at any practical distance from the optical ceramic, e.g., 1 m to 100 m or more, with suitable optics to steer the beam and control beam divergence. The aperture that controls the spot size and location is typically located close to the optical ceramic, e.g., mm to cm, depending on the optics used to steer and focus the beam.

The present invention uses an optical illumination means to spot anneal optical ceramics along the edges of the ceramic to improve the stress resistance of the optical ceramic. In the preferred form of the invention, the laser is a $CO_2$ laser and the optical ceramic is a beveled sapphire window. Other improved, enhanced, alternative or modified illumination sources and optical ceramic materials may used as well. However, those enhancements, improvements and modifications may nonetheless fall within the spirit and scope of the following claims.

What is claimed is:

1. A method of treating an optical ceramic having an edge and an optical surface, said edge having microscopic flaws, said optical surface is exposed to stresses during use, the method comprising the steps of, preheating said optical ceramic to a temperature below an annealing temperature of said optical ceramic, generating an illumination beam having a wavelength that can be absorbed by said optical ceramic, and illuminating said edge of said optical ceramic to heat said edge above said annealing temperature to reduce said microscopic flaws and increase edge mechanical strength while not illuminating said optical surface to not raise the temperature of said optical surface above said annealing temperature to prevent deformation of said optical surface, said illumination beam is a $CO_2$ laser beam, and said optical ceramic is a sapphire window.

2. A method of treating an sapphire window having a beveled edge and an optical surface, said beveled edge having microscopic flaws, said sapphire window secured by said beveled edge during use to expose said optical surface to stresses, the method comprising the steps of, preheating said sapphire window to a temperature below an annealing temperature of said sapphire window, generating a $CO_2$ laser illumination beam having a wavelength that can be absorbed by said sapphire window, and illuminating said beveled edge of said sapphire window to heat said beveled edge to a temperature above said annealing temperature to reduce said microscopic flaws and increase edge mechanical strength while not illuminating said optical surface to not raise the temperature of said optical surface above said annealing temperature to prevent deformation of said optical surface.

3. The method of claim 2 wherein, said sapphire window is an optical window of a high-speed rocket-powered interceptor-seeker missile, said beveled edge is for securing said optical window into a window molding of said missile, said molding covering said beveled edge and exposing said optical surface, and said stresses upon said optical surface are aerodynamic heating and air pressure loading stresses, said stresses tending to couple through said optical window towards said beveled edge tending to crack said optical window at said microscopic flaws of said beveled edge during flight of said missile.

* * * * *